(12) United States Patent
Chin et al.

(10) Patent No.: US 6,424,503 B1
(45) Date of Patent: Jul. 23, 2002

(54) BEARINGLESS PIVOT CARTRIDGE

(75) Inventors: Wui Ching Chin; Kian Theng Ong, both of Singapore (SG)

(73) Assignee: Beltontech SDN BHD, Johor (MY)

( * ) Notice: Subject to any disclaimer, the term of this patent is extended or adjusted under 35 U.S.C. 154(b) by 0 days.

(21) Appl. No.: 09/458,332

(22) Filed: Dec. 10, 1999

Related U.S. Application Data
(60) Provisional application No. 60/158,597, filed on Oct. 8, 1999.

(51) Int. Cl.$^7$ ................................................. G11B 5/55
(52) U.S. Cl. .................................................. 360/265.2
(58) Field of Search ........................... 360/264.3, 265.2, 360/265.6, 265.7

(56) References Cited

U.S. PATENT DOCUMENTS

| | | | |
|---|---|---|---|
| 5,029,030 A | * | 7/1991 | Luecke ........................ 360/106 |
| 5,355,268 A | | 10/1994 | Schulze |
| 5,432,663 A | | 7/1995 | Ichihara |
| 5,510,940 A | | 4/1996 | Tacklind et al. |
| 5,559,652 A | | 9/1996 | Heath et al. |
| 5,621,590 A | | 4/1997 | Pace et al. |
| 5,628,571 A | | 5/1997 | Ohta et al. |
| 5,680,276 A | | 10/1997 | Takekado |
| 5,712,750 A | | 1/1998 | Kim |
| 5,757,588 A | | 5/1998 | Larson |
| 5,761,006 A | | 6/1998 | Sri-Jayantha et al. |
| 6,046,889 A | * | 4/2000 | Berding et al. ............. 360/106 |
| 6,205,005 B1 | * | 3/2001 | Heath ...................... 360/266.1 |

* cited by examiner

*Primary Examiner*—Brian E. Miller
(74) *Attorney, Agent, or Firm*—Bruce A. Jagger (57) ABSTRACT

A bearingless pivot cartridge for an actuator arm of a hard disk drive assembly having no moving contact points while providing precise rotational movement of the actuator arm about an axis within an axial region and within a limited angular arc range. The actuator arm is mounted to the frame of the hard drive assembly through a cantilever member that is capable of flexing through a limited arc of approximately 20 to 50 degrees along a hinge line, but without stretching or warping.

10 Claims, 6 Drawing Sheets

BEARINGLESS PIVOT CARTRIDGE

This application claims priority from provisional application Ser. No. 60/158,597, filed Oct. 8, 1999.

BACKGROUND OF THE INVENTION

1. Field of the Invention

The invention relates in general to rotary actuators for tape and disk drives and, in particular, to a combined actuator mount and pivot member having no moving contact points that provides precise rotational movement of an actuator arm about an axis within an axial region and within a limited angular arc range.

2. Description of the Prior Art

Contemporary hard disk drives employ a rotary actuator arm within a hard disk support structure. Transducers or read/write heads are located at the end of the rotary actuator arm. During use, the arm is rotated to precisely position the read/write heads relative to data tracks located on the surface of storage/retrieval disks. Repeatability, that is, the ability of the heads to return to exactly the same location relative to the disks on every cycle, is absolutely essential. The storage/retrieval disks are rotatably mounted within the same hard disk support structure. The hard disk support structure includes a base, a cover, and a seal to protect the contents from environmental contamination. Often the actuator arm has a plurality of extended fingers supporting a plurality of transducer heads that track a plurality of storage/retrieval disks co-axially mounted in a single hard disk assembly.

The movement of the transducers must be controlled with great precision in order for the hard disk assembly to function properly. Thus, the rotational movement of the actuator arm must be controlled with great precision. The rotation must be free of looseness or backlash. The precise angular movement of the actuator arm is electromagnetically controlled by regulating current travelling through a coil mounted on the actuator arm which is positioned between two permanent magnets. For a specific current value moving through the coil, the actuator arm is precisely rotated to a specific position. However, if there is too much rotational friction in the pivot structure, the actuator arm, in response to a specific current value, can be incorrectly positioned. Thus, conventional expedients had attempted to effect the rotation of the actuator arm with as little rotational friction resistance as possible since it had been believed that such undesirable friction can cause read/write errors.

Previous expedients generally provided precision roller bearings in the assembly to precisely control the rotational movement and positioning of the actuator arm. Precision roller bearings incorporate a plurality of ball bearings positioned between annular races. The ball bearings are often lubricated to further reduce friction. The lubricants within the sealed hard disk support structure had presented serious problems because of the potential that any lubricants that escaped from the bearings can undesirably contaminate the surfaces of the storage/retrieval disks in the assembly. An example of a roller bearing assembly utilized in a hard disk drive assembly is disclosed, for example, in U.S. Pat. No. 5,510,940 to Tacklind et al.

There are numerous drawbacks to the previous expedient of using precision roller bearings. One drawback is that they are relatively expensive components because each part in the bearing must be manufactured to exacting tolerances, which, in turn, increases their costs. Another drawback is that they must be assembled in a clean room to prevent the possibility of contamination. This also increases assembly costs. Still another drawback is that the rotational frictional resistance of a precision roller bearing changes responsive to temperature changes, minute irregularities in its components, changes in the characteristics of the lubricant, contaminants, and the like. These changes have resulted in read/write errors on the storage/retrieval disks, because the transducers do not return to exactly the same locations on the disks on every cycle. Attempts to solve this problem have undesirably increased the cost and complexity of the assembly. For example, in U.S. Pat. No. 5,628,571 to Ohta et al an additional preload spring is included to act against bearing races made from dissimilar metals in order to counter the effects of temperature variation. Other friction problems result from contaminants which, when present, must be overcome by the electromagnetic forces of the actuator. Such contaminants, when present, create a resistance that is inconsistent and non-repeatable. For example, an actuator arm could rotate 2 to 4 degrees with little or no frictional resistance until a contaminant particle, which happens to reside on a ball bearing, impacts a contact point in one of the races in the bearing. This contact creates an instantaneous increase in frictional resistance. This instantaneous increase in frictional resistance is not repeatable, predictable or consistent since contaminant particles can move or be crushed into multiple particles when inside a roller bearing. The problem can further be complicated when the particles cause wear or pitting of the ball bearing surfaces or races. Thus, generally the problem is not rotational friction per se, but rather intermittent, unpredictable and non-repeatable rotational resistance. When roller bearings are used, this problem is generally unsolvable because thermal variation, particulate contaminants, as manufactured irregularities, lubricant changes, wear and pitting, and the like are unavoidable.

There are other drawbacks as well in utilizing precision roller ball bearings. They are susceptible to damage when improperly handled. For instance, when subjected to drive and shock vibration tests, damage to the bearings had been observed. Such damage can cause the loss of designed preload, which causes backlash in the actuator arm assembly. Such backlash can result in catastrophic read/write errors. In addition, as technological advances in storage/retrieval disks continue, the number of data storage tracks per inch on the disks continues to increase. This requires even closer tolerances for the roller ball bearings. Achieving these greater roller bearing tolerances, even if physically possible, would undesirably further increase the cost of the assemblies. Thus, as more data tracks are placed on read/write disks, the problems that are inherent in the use of precision roller bearings in hard disk actuator arm assemblies are becoming very serious.

Due to the continued growth and competition in the computer industry, the need has arisen for mass-produced, inexpensive hard disk drive assemblies having improved performance and reliability characteristics. Thus, there is a need to reduce the cost of the hard disk drive assemblies by eliminating the use of precision roller bearings in the actuator arm pivot.

There have been some prior expedients proposed for the elimination of precision roller bearings in actuator arm pivot assemblies. In U.S. Pat. No. 5,355,268 to Schulze, a pin/cup pivot is disclosed establishing either rolling or sliding contact between the pin and cup. The pin is fixedly attached to the actuator arm and the cup is fixedly attached to the support structure. The pin/cup pivot configuration is not mount stable by itself, that is, it requires additional components to maintain the pin against the cup. For example, a magnetic system is disclosed to maintain the pin against the cup and thereby provide the required mount stability. Another attempt to eliminate the use of precision roller bearings is disclosed in U.S. Pat. No. 5,757,588 to Larson. A plurality of resilient fingers snappedly and slideably engage a pivot shaft fixed to the support structure. However, the mount stability of the pivot structure to shock loads is inherently limited by the elasticity of the resilient fingers on the pivot shaft.

All the prior art expedients rely on rolling and/or sliding contact points in the pivot area. Undesirably, some form of lubrication and/or protection from contaminants is required. Temperature variations also pose problems for these rolling or sliding contact based expedients. Temperature variations can alter the rotational frictional resistance of the pivot structure and thereby undesirably result in read/write errors for the hard disk assembly.

Therefore, there is a need to provide a less complicated, less expensive, more reliable pivot structure for mounting hard disk actuator arms. There is also a need to provide a pivot structure that has no moving or rolling contact points. There is also a need to provide a bearingless pivot structure that provides its own mount stability in order to counter shock loads, without additional components or systems. There is also a need to provide a pivot structure that requires no lubrication or contamination protection, and does not wear or pit.

These and other difficulties of the prior art have been overcome according to the present invention.

BRIEF SUMMARY OF THE INVENTION

A preferred embodiment of the combined actuator mount and pivot assembly according to the present invention comprises a flexible cantilever member fixedly engaged to a base mount structure at one end and fixedly engaged to an actuator cartridge member at the other end. Flexing the flexible cantilever member along a hinge line between the base mount structure and the actuator cartridge member causes rotational movement of the rotary actuator arm through an arc of from approximately 20 to 50 degrees, more or less. The flexible cantilever member also supports the rotary actuator arm in operative position with respect to the disks. The rotary actuator arm is thus mounted to the frame of a hard drive through a flexible hinge that has no moving parts. The flexible hinge permits the rotary actuator arm to pivot through an arc of limited extent with a very high degree of positional repeatability. The physical dimensions and properties of the member or members that form the flexible hinge are selected so that it does not stretch in any direction in the hinge area and will flex without suffering bending fatigue for the expected life of the hard drive. Importantly, when the pivot cartridge rotates, there are no moving contact points, slack, or backlash. While not wishing to be bound by any theory of operation, it is believed the hinge line is a small axial region within which the rotary actuator arm rotates about an instantaneous axis at any given position within a limited angular arc range. For a given angular position the position of the instantaneous axis is substantially identical in every cycle. The positioning of the read/write heads is thus repeatable from cycle to cycle.

According to one embodiment, the actuator cartridge member has an outer cylindrical surface that can be inserted into a mount hole in an actuator arm and fixed therein, making the bearingless pivot cartridge assembly interchangeable with prior art precision roller bearing cartridges.

The cantilever member should be substantially non-elastic in a direction extending between its opposed ends and be highly resistant to fatigue failure due to bending. Any elongation of the cantilever member in the plane of the cantilever member or twisting of the cantilever member out of that plane would substantially impair the repeatability of the system. Non-elastic organic polymers have been found to serve well as the material for the cantilever member. It has been found, for example, that polyimide films posses the required non-elastic characteristic in a direction extending between the ends of the film while not suffering from fatigue failure. In a preferred embodiment, an about 0.005 inch thick polyimide film material is used to form the cantilevered member. It is non-elastic, exhibits no bending fatigue over the expected life of the hard drive, and its bending resilience is such that the electromagnetic controls of the actuator arm generally need not be modified to accommodate it in most hard drive configurations. Although in a preferred embodiment the cartridge assembly is adapted to replace conventional roller bearing cartridge assemblies, the cantilever member and base mount structure subassembly could be directly installed to the actuator arm, if desired. The cantilever member can conveniently take the form of a panel having a length at least at the hinge line that is at least 50, and preferably 100 times the thickness of the panel. The panel can be a single piece or several pieces, provided the inelastic and non-warping characteristics at the hinge line are maintained.

BRIEF DESCRIPTION OF THE DRAWINGS

Referring particularly to the drawings for the purposes of illustration and not limitation.

DETAILED DESCRIPTION OF THE PREFERRED EMBODIMENTS

Figure 1:
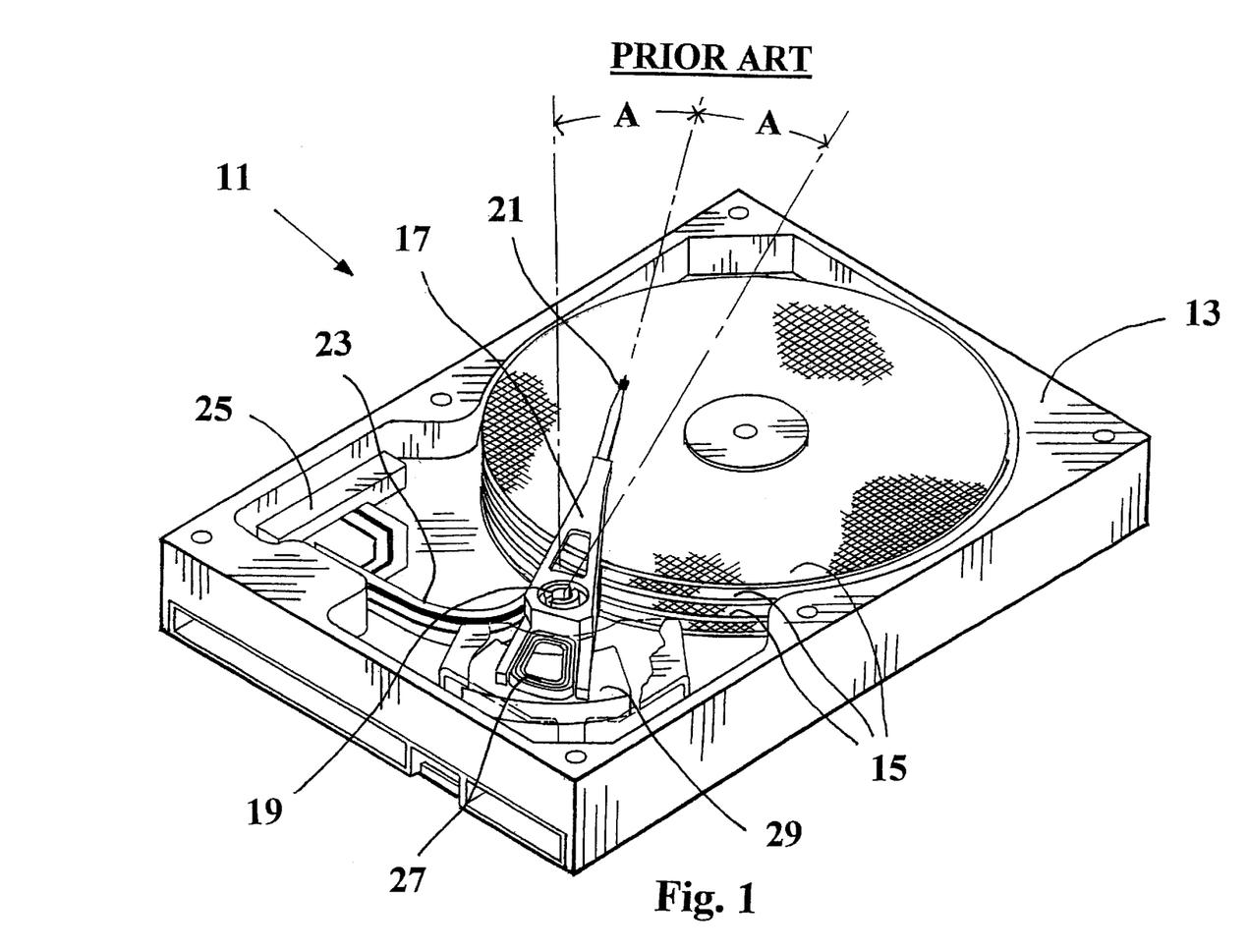
FIG. 1 is an isometric view of a prior art computer hard disk assembly.

Shown generally at 11 in FIG. 1 is a prior art computer hard disk assembly with its top cover removed. The prior art assembly comprises a plurality of storage/retrieval disks 15 rotably mounted to support structure 13. Each storage/retrieval disk has a plurality of closely spaced circular data tracks in which information can be stored. An actuator arm 17 is rotably mounted to the support structure 13 with pivot cartridge 19. At the end of actuator arm 17 are transducer or read/write heads 21 which store and retrieve data from the storage/retrieval disks. Data communicated to or from the transducer heads are transmitted through flexible circuit board 23 which is connected at one end to the actuator arm and at the other end to output port 25. In most conventional computer hard disk assemblies, the actuator arm 17 generally rotates no more than about 15 degrees right or left from a center position, shown as "A" in FIG. 1. Although the amount of rotation is slight, it must be extremely precise so that the transducer heads can accurately track each circular data track on the storage/retrieval disks. Regulating the amount of current flowing through coil 27 drives the precise rotational movement. The coil is mounted on the actuator arm and is positioned between two permanent magnets mounted in a fixed relationship with the support structure. The bottom magnet is shown at 29, the top magnet is not shown for clarity. Precisely regulating current flow is easily accomplished with basic electronic circuitry techniques, and when the current flow is precisely regulated through the coil positioned between two permanent magnets, the angular position of actuator arm 17 can be precisely controlled, provided there is little or no friction or backlash in the pivot cartridge. Hence, it is well known in the art that the design of the pivot cartridge is critical to the proper functioning of the computer hard disk drive assembly.

Figure 2:
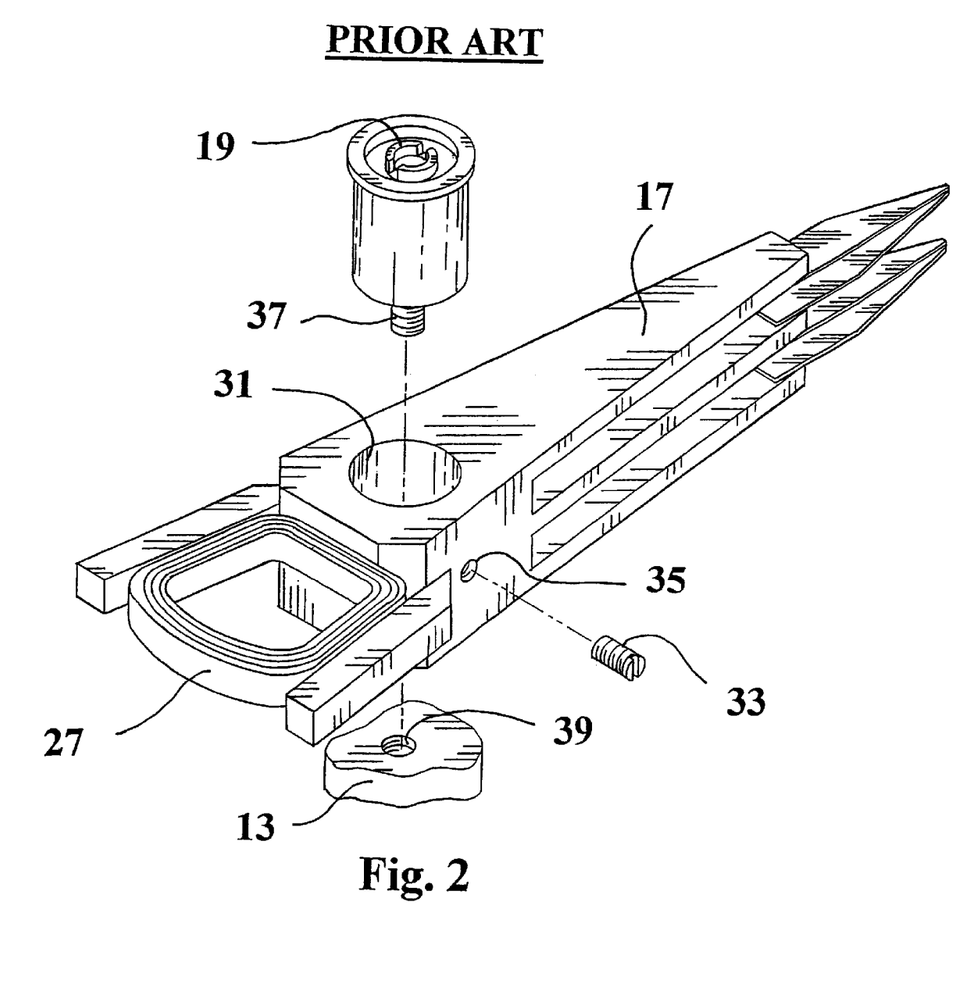
FIG. 2 is an exploded isometric view of a prior art computer hard disk actuator arm and bearing cartridge.

Shown in FIG. 2 is an exploded view of a conventional pivot cartridge 19, actuator arm 17, and support structure or base 13 of a computer hard disk drive assembly. Mount hole 31 is provided in actuator arm 17 to receive pivot cartridge 19, and set screw 33 is installed into threaded hole 35 to secure the pivot cartridge to the actuator arm. Typically the pivot cartridge is provided with a threaded end 37 which threadably engages hole 39 located in the support structure or base. Having a removable pivot cartridge is desirable since it is readily adaptable for numerous hard disk configurations, and has become standard in the art.

Figure 3:
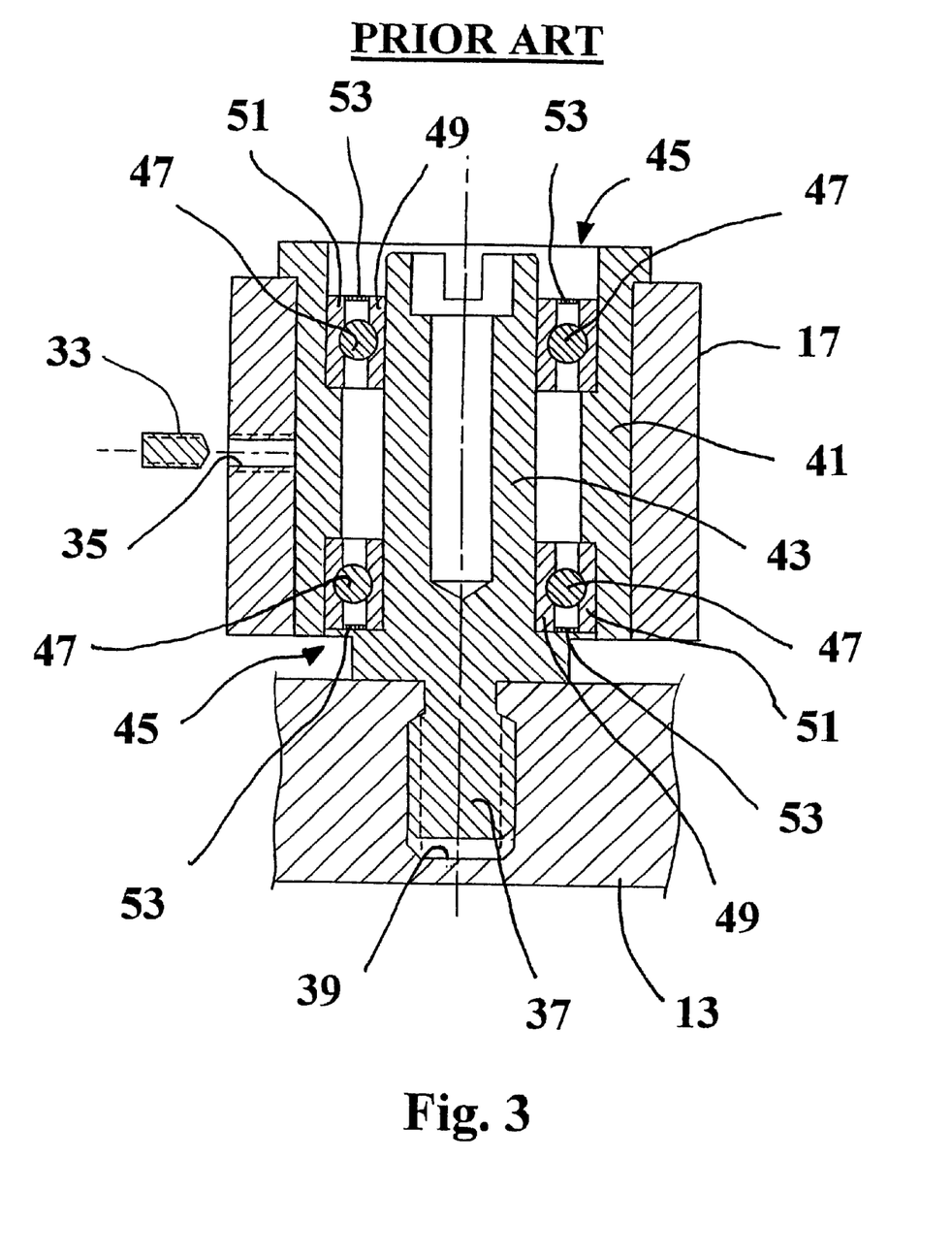
FIG. 3 is a sectional view of a prior art precision roller bearing cartridge.

As discussed previously, the design of the pivot structure is critical for proper operation of a hard disk drive assembly. The structure must essentially be frictionless with no backlash or slack. Shown in FIG. 3 is a conventional roller bearing cartridge design. The conventional roller bearing cartridge design has an outer cylindrical body 41 that is securely held in place with the actuator arm via set screw 33, and an inner cylindrical body 43 that is securely held in place with support structure 13 via threaded end 37. Two precision roller bearings, generally shown at 45, have a plurality of roller bearings 47 that ride between inner races 49 and outer races 51. In order to provide the required frictionless rotational movement of the cartridge, the roller bearings and inner and outer races must be manufactured at very high tolerances. In addition, contaminants must not be able to enter the roller bearings, as they would undesirably introduce friction into the system. This is often accomplished by assembling the bearings in a clean room, which undesirably increases their cost. Often lubrication is provided in the roller bearings, and bearing seals 53 are provided to prevent contaminants from entering the bearings and to prevent the lubrication from outgassing and contaminating the storage/retrieval disks.

The prior art precision roller bearing cartridge assembly shown in FIG. 3 has numerous drawbacks. One drawback is that the precision roller bearings are relatively expensive components. This is because each roller bearing has numerous rolling contact points requiring the parts be manufactured to exacting tolerances which, in turn, increases their costs. Another drawback is that the rotational frictional resistance of a precision roller bearing changes according to temperature changes within the bearing. These changes can result in read/write errors of the storage/retrieval disks. Attempts to solve this problem have undesirably increased the cost and complexity of the assembly. For example, in U.S. Pat. No. 5,628,571 to Ohta et al, in order to counter the effects of temperature variation, a preload spring is included to act against bearing races made from dissimilar metals. Thus, there is a need to reduce the cost of the hard disk drive assemblies by eliminating the use of precision roller bearings in the actuator arm pivot and, in general, to provide a simple, inexpensive bearingless actuator.

The conventional wisdom of the prior expedients teaches that an effective pivot cartridge must be as nearly frictionless as possible, that is, that there should not be any resistance introduced in the pivot action of the actuator arm by the pivot cartridge. This is evidenced by the prior attempts to eliminate such resistance, particularly by utilizing precision roller bearings that are essentially frictionless. Uniquely, the present invention teaches away from the conventional wisdom. According to the present invention, it is not frictional resistance per se that must be eliminated, whether static or sliding or both, but rather it is the intermittent, inconsistent, and non-repeatable resistance that must be avoided. It has been found that by eliminating rolling or sliding contact points in the pivot cartridge by the use of a cantilevered member, intermittent, inconsistent, and non-repeatable rotational resistance is not just avoided, but eliminated. What has been uniquely discovered according to the present invention is that any amount of resistance can be inherent in the pivot structure as long as it is predictable and repeatable. Such predictable and repeatable resistance can be governed by any number of mathematical relationships that, in turn, can be used to assist in modifying the electromagnetic controls of the actuator coil to compensate for this resistance. For example, the relationship between rotation of the actuator arm and the resistance of the cantilever member could be linear, however other relationships are possible as well.

Figure 4:
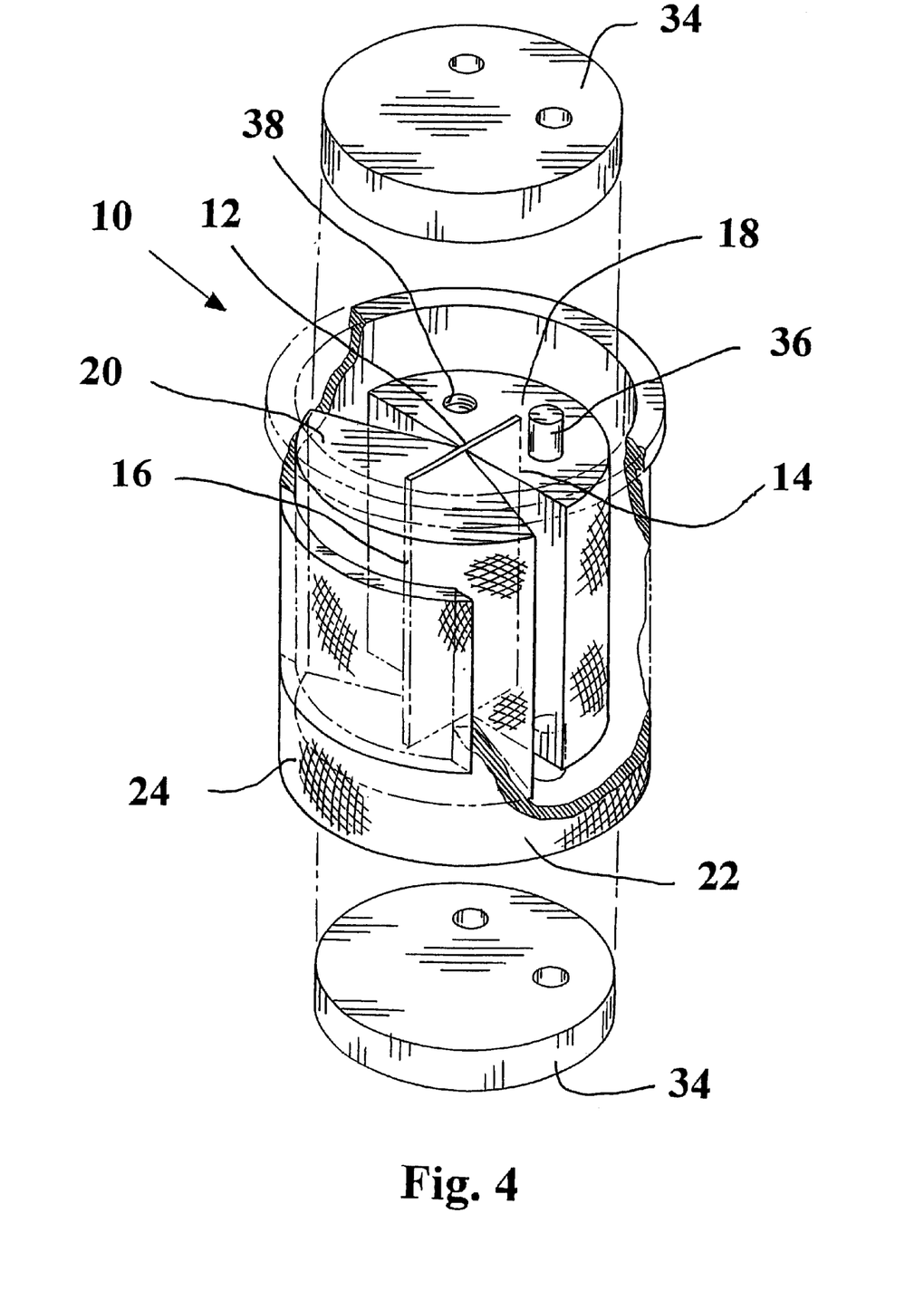
FIG. 4 is a preferred embodiment of a partially broken, partially exploded, isometric view of the present invention bearingless pivot cartridge.
Figure 5:
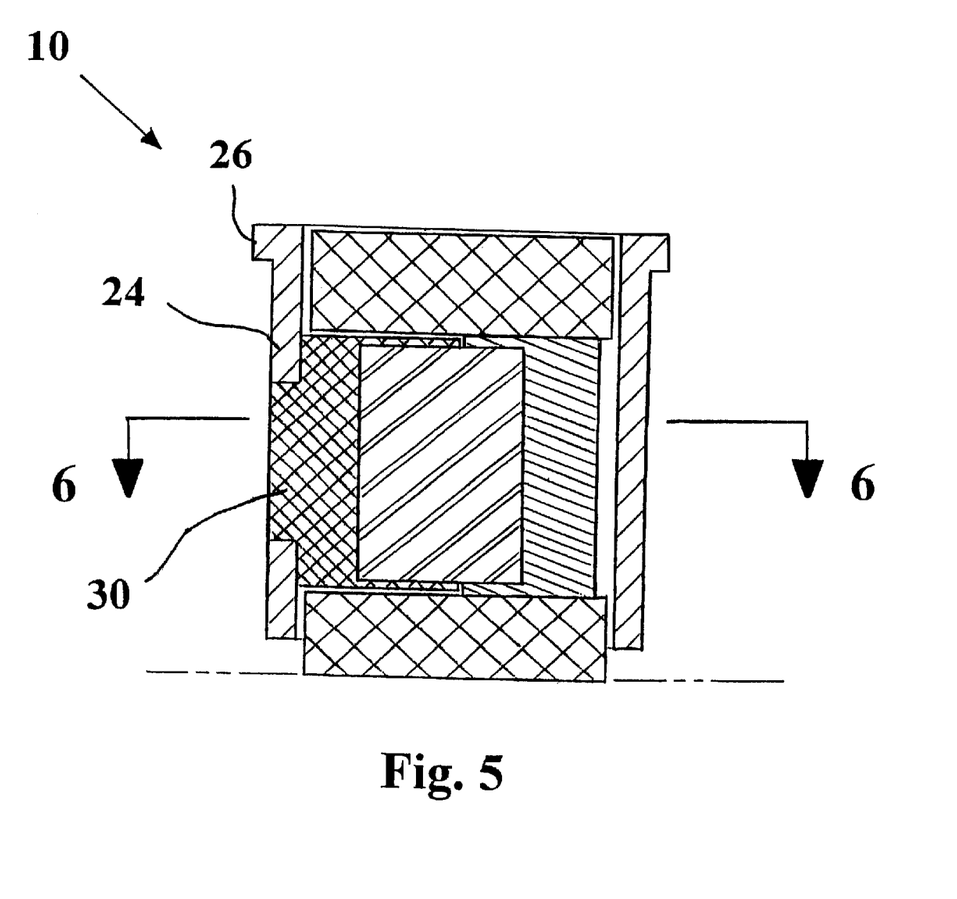
FIG. 5 is a sectional view of a preferred embodiment of the present invention bearingless pivot cartridge.
Figure 6:
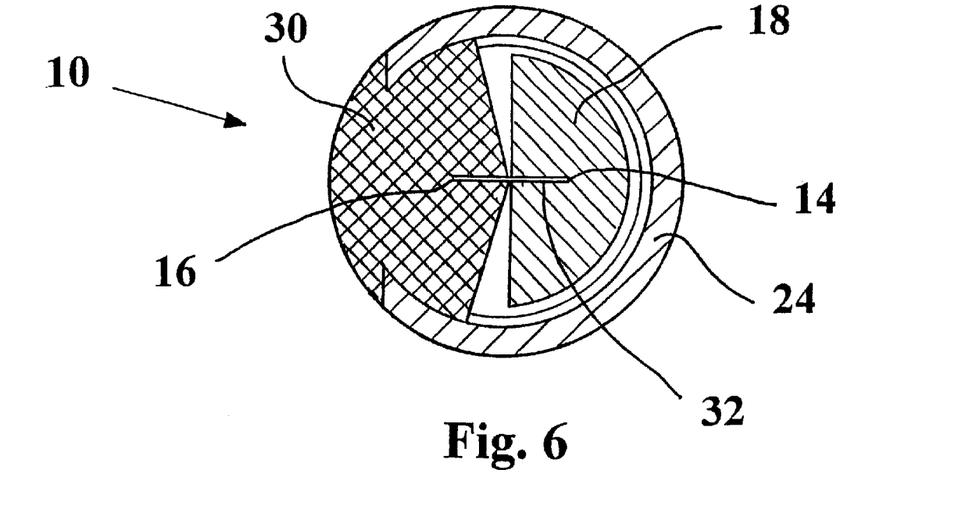
FIG. 6 is a top sectional view of a preferred embodiment of the present invention taken from FIG. 5.

Referring, for example, to FIGS. 4 through 6, there is illustrated generally at 10 a bearingless pivot cartridge, or combined cantilevered actuator mount and pivot member that has no moving contact points. The bearingless pivot cartridge has no moving contact points due to the unique flexible cantilever member 12. The flexible cantilever member 12 has one end 14 fixedly engaged to a base mount structure 18, and an opposed end 16 fixedly engaged to an actuator cartridge member 20. The actuator cartridge member 20 has an outer cylindrical surface 22 that can be inserted into the prior art actuator arm pivot mount hole 31 shown in FIG. 2. As such, the embodiment shown in FIGS. 4 through 6 can be substituted in place of the prior art precision roller bearing cartridge 19 without any other modifications to the assembly.

The flexible cantilever member can be formed from numerous tough, flexible materials. For instance, many polymer materials can be used, for example, such as nylon, polypropylene, polyethylene, polyester, polycarbonate, polystyrene, polyurethane, polyvinyl chloride, polyvinyl fluoride, and the like. Also, composite film combinations made from a polymer base material could also be used, if desired. For instance, a polycarbonate glass fiber reinforced sheet material could be used. Woven cloth materials impregnated with polymer materials could also be used. In addition, the flexible cantilever member could also be made from metals and their alloys, such as tool steel, stainless steel, aluminum alloys, and the like. The possible types and combinations of materials that can be selected to comprise the flexible cantilever member are nearly infinite, the significant feature being that the material be substantially non-elastic under tensile forces while remaining resiliently flexible under bending loads without developing undesirable fatigue failure due to crack propagation.

In the preferred embodiment shown in FIGS. 4 through 6 and referred to for purposes of illustration, the flexible cantilever member is formed from about a 0.005 inch thick polyimide film. For some hard drive configurations, the 0.005 inch thick polyimide film is advantageous as it is very flexible and may not require modification of the electromagnetic controls of the actuator arm to compensate for its resiliency. Other thicknesses could be used, if desired, such as 0.004-inch thick polyimide film. The polyimide film is also advantageous as it is a proven material that does not produce undesirable properties, such as outgassing, and the like, as it is already approved and used in the flexible circuit board 23 of hard disk drive assemblies. Other flexible resilient but non-elastic materials may be used, as desired. In addition, more than one flexible cantilever member may be used, as desired, in a bearingless pivot cartridge. Although the flexible cantilever member shown in FIGS. 4 through 6 is generally in the form of a single flat plate or sheet, other shapes may be used, as desired. For example, a plurality of resilient rods or columns could be used. The spacing of the flexible cantilever structure, whether in one piece or more, along the hinge line is such that the length of the hinge line is at least 50 and preferably 100 times its thickness.

Importantly, the cantilever member must be substantially non-elastic in a direction extending between its opposed ends. It should not stretch in any direction along the hinge line. If the cantilever member were elastic in any such direction, the mounting of the actuator arm would not be stable, and could undesirably result in read/write errors of the hard disk because the repeatability of the positioning of the arm from cycle to cycle was impaired. Many non-elastic materials, when repeatedly bent or flexed, undesirably suffer fatigue failure. Materials that suffer from fatigue failure are unacceptable for use in the present invention, and materials that do not suffer fatigue failure are often too elastic for use in the present invention. Thus, proper selection of material for the cantilever member is critical to the present invention. It has been found that, for example, polyimide films posses the required non-elastic characteristic in a direction extending between the ends of the film while not suffering from fatigue failure.

In the preferred embodiment, the base mount structure 18 is machined from aluminum with grove 32 to receive the flexible cantilever member. The grove 32 provides an interference fit for the polyimide film that is generally about 0.0003 inches wide. Alternatively, if there is no interference fit, the base mount structure can be inwardly compressed or crimped such that the cantilever member is securely held within grove 32. Other methods of securing the flexible cantilever member with the base mount structure may be used, if desired. In the preferred embodiment, this subassembly, comprising the cantilever member 12 and base mount structure 18, is positioned within the outer cylindrical tube, as discussed above, just prior to injection molding the plastic inner member 30 in place.

After the plastic inner member 30 is injection molded into place, end caps 34 are affixed to the base mount structure in which the bottom one, shown in FIG. 5, is affixed to the support structure of a hard disk drive assembly. Preferably the end caps are machined from metal material such as aluminum or the like, and alignment pins 36 are used to center the end caps over the flexible cantilevered member. Mount screws, not shown, may be used to attach the end caps to threaded holes 38 provided in the base mount structure 18. One end cap is conventionally attached to the surface of a hard disk assembly support structure, for example, by providing a threaded protrusion on one end cap that threadably engages a threaded hole in the support structure, as shown in the prior art roller bearing cartridge assembly. Other attachment means may be used, as desired, such as chemical bonding, force fits, and the like. In addition, the end caps can be eliminated, if desired, for example, by extending the length of the base mount structure. In addition, the end caps could be integrally formed with the base mount structure, if desired.

Although the preferred embodiment cartridge assembly is adapted to replace conventional roller bearing cartridge assemblies, the cantilever member and base mount structure subassembly could be directly installed to the actuator arm. For instance, the inner member could be molded directly to the actuator arm, eliminating the need for the outer cylindrical tube structure.

Figure 7:
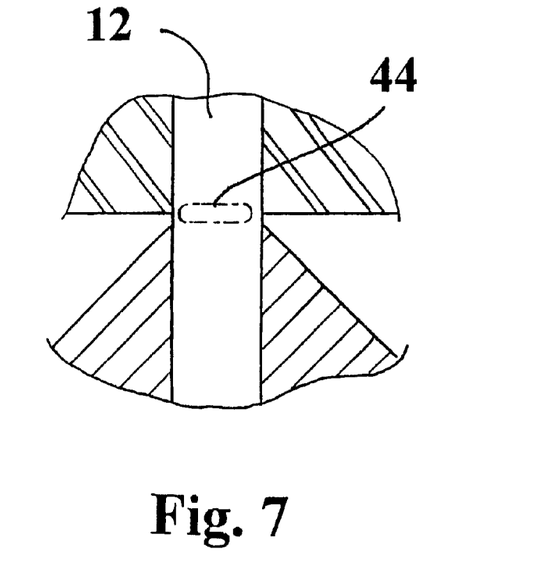
FIG. 7 is a magnified top sectional view showing the flexible cantilever member in the straight position.
Figure 8:
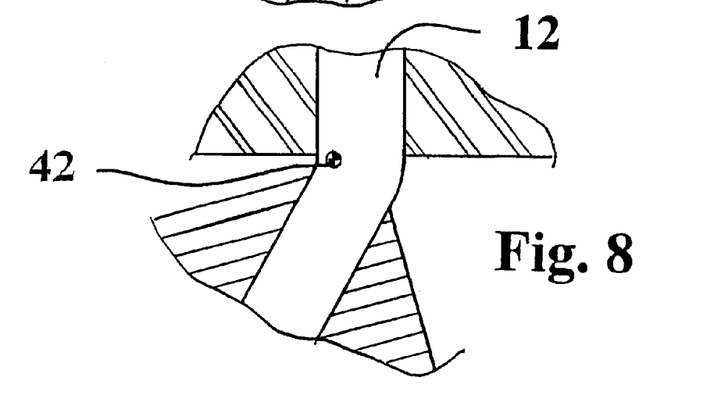
FIG. 8 is a magnified top sectional view showing the flexible cantilever member rotated to the left.
Figure 9:
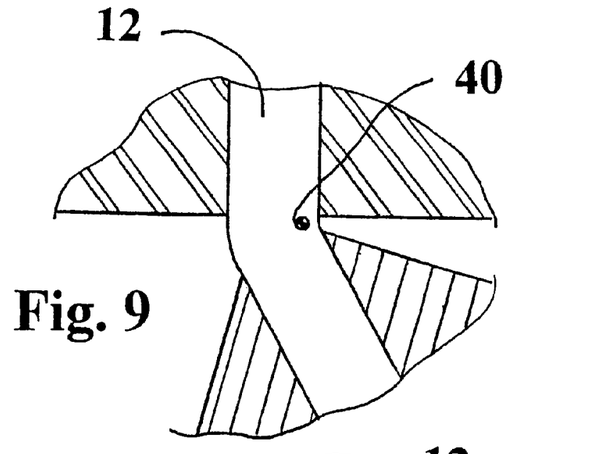
FIG. 9 is a magnified top sectional view showing the flexible cantilever member rotated to the right.

Importantly, the bearingless pivot cartridge rotates such that the end caps rotate separate from the outer cylindrical tube. The outer cylindrical tube is conventionally held in place with a hard disk drive actuator arm while one of the end caps is conventionally held in place on the support structure of the hard disk drive assembly. Importantly, when the pivot cartridge rotates, there are no moving contact points, slack, or backlash. Not to be bound to any theory of operation, it is believed the pivot cartridge precisely rotates the actuator arm about an axis within a axial region and within a limited angular arc range, that is, the angular arc range as shown in FIG. 1 at "A". For example, referring to FIG. 9, when the pivot cartridge is pivoted to the right, the pivot axis is believed to reside near the right surface of the flexible cantilever member, as shown at 40. Referring to FIG. 8, when the pivot cartridge is pivoted to the left, the pivot axis is believed to reside near the left surface of the flexible cantilever member, as shown at 42. Hence, it is believed that at any given position, the pivot axis of the cantilevered actuator mount and pivot member resides within a fixed axial region, as shown in FIG. 7 at 44. This axial region remains fixed relative to the support structure of the hard disk drive assembly. This axial region is also believed to be relatively small, for example, it believed that it cannot exceed the thickness of the cantilever member, and is therefore likely to have a diameter of less than 0.005 inches in the preferred embodiment shown. The distance or gap between base mount structure 18 and inner member 30 is no greater than 0.005 inches.

Uniquely, the preferred embodiment bearingless pivot cartridge pivots without any moving contact points and utilizes less parts than conventional bearing assemblies. Advantageously, there is no need for lubrication or protection from contaminants. No longer is there a need to assemble components such as the precision roller bearings in a clean room. In addition, the present invention eliminates the need for utilizing expensive precision roller bearings that currently impose a significant cost to hard disk drive assemblies. Uniquely, an inexpensive flexible cantilever member made from a polyimide film, which is essentially non-elastic in a direction extending between opposed ends and is virtually immune to fatigue failure due to bending, provides precise rotational movement and mounting stability to a hard disk read/write actuator arm.

Although the preferred embodiment bearingless pivot cartridge assembly has been described for use in the application of computer hard disk drive assemblies, the assembly can easily be used for numerous applications requiring precise pivoting action within a limited arc range. For example, the assembly could be adapted for use in pivoting actuator structures in tape drives, and the like.

What have been described are preferred embodiments in which modifications and changes may be made without departing from the spirit and scope of the accompanying claims.

What is claimed is:

1. A hard disk drive including a frame, a disk and a rotator arm, said rotator arm including a read/write head positioned in operative information writing and reading association with said disk, said disk being rotatably mounted on said frame, said rotator arm being mounted solely through a flexible cantilever member for pivotal movement on said frame about an instantaneous pivot axis, said flexible cantilever member being substantially non-elastic in tension and having a thickness, and said instantaneous pivot axis having a length, said length being more than about 50 times said thickness, said instantaneous pivot axis residing entirely within a fixed axial region, and said fixed axial region being entirely within said flexible cantilever member, said fixed axial region having a diameter less than said thickness.

2. A hard disk drive of claim 1 wherein a first end of said flexible cantilever member is secured to an inner member, and said inner member is secured to said actuator arm.

3. A hard disk drive of claim 1 wherein a first end of said flexible cantilever member is secured to an inner member, and said inner member is secured to a cartridge that is adapted to being received in a mating bore in said actuator arm.

4. A hard disk drive of claim 1 wherein said flexible cantilever member is one single piece of material.

5. A hard disk drive of claim 1 wherein said flexible cantilever member is formed from sheet material having a thickness of less than about 0.005 inches.

6. A hard disk drive of claim 1 wherein said flexible cantilever member is formed from polyimide film.

7. A hard disk drive of claim 1 wherein said flexible cantilever member is formed from polyimide film having a thickness of less than about 0.005 inches.

8. A hard disk drive of claim 1 wherein a first end of said flexible cantilever member is fixedly engaged to an inner member, and an opposed second end of said flexible cantilever member is fixedly engaged to a mount post, said inner member and said mount post being spaced apart by a gap of no more than about 0.005 inches, and said fixed axial region being substantially within said gap.

9. A disk drive support structure having a disk drive actuator arm pivotally mounted thereon, said disk drive actuator arm being mounted for pivotal movement about an instantaneous pivot axis within an axial region, said axial region being fixed relative to said disk drive support structure;

an extension of said disk drive support structure being mounted to said disk drive support structure and spaced from said disk drive actuator arm by a gap; and A flexible cantilever member bridging said gap and affixed to both said extension and said disk drive actuator arm, said flexible cantilever member being substantially non-elastic in tension, said axial region being within said gap and within said flexible cantilever member, said disk drive actuator arm being mounted to said extension solely through said flexible cantilever member.

10. A method of pivotally mounting a disk drive actuator arm on a disk drive support structure, said disk drive actuator arm being mounted for pivotal movement about an instantaneous pivot axis within an axial region, said axial region being fixed relative to said disk drive support structure, said method comprising the steps of:

providing a gap between said disk drive actuator arm and an extension of said disk drive support structure;

providing a flexible cantilever member bridging said gap and anchored to both said extension of said disk drive support structure and said disk drive actuator arm, said flexible cantilever member being substantially non-elastic in tension, said axial region being within said gap and within said flexible cantilever member; and allowing said disk drive actuator arm to pivot about said instantaneous pivot axis supported only by said flexible cantilever member.

* * * * *